Jan. 22, 1935. H. G. WELSFORD 1,988,640
METHOD OF PRODUCING RUBBER COVERED SUCTION ROLLS
Filed March 6, 1933
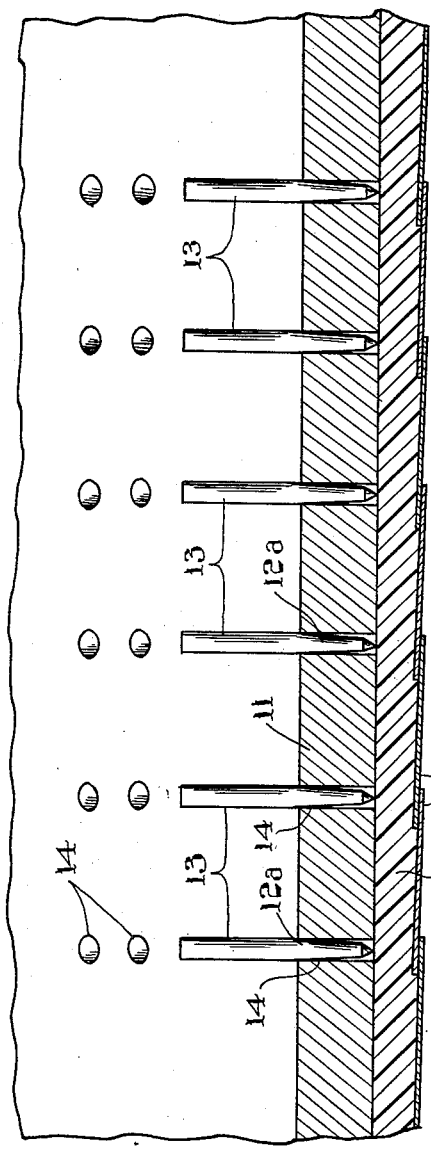
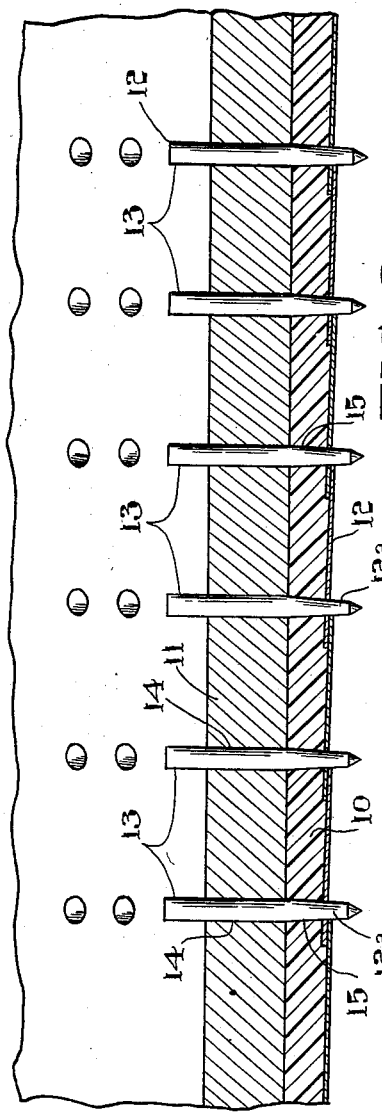
INVENTOR
HUBERT.G.WELSFORD
BY J. T. O'Connell
ATTORNEY Patented Jan. 22, 1935

1,988,640

UNITED STATES PATENT OFFICE 1,988,640

METHOD OF PRODUCING RUBBER COVERED SUCTION ROLLS

Hubert G. Welsford, Montreal, Quebec, Canada, assignor to Dominion Engineering Works Limited, Lachine, Quebec, Canada Application March 6, 1933, Serial No. 659,768

3 Claims. (Cl. 18—59)

This invention relates to rubber covered suction rolls for paper making machinery. In producing rolls of this type the rubber covering is applied in a raw state, then vulcanized, and then drilled from the outside to provide the necessary openings in line with the openings previously drilled in the metal roll. A special form of expensive drilling apparatus, accurately adjusted according to a predetermined index, is employed for drilling the holes in the metal roll and the same apparatus is subsequently used for drilling the rubber covering after the latter has been applied to the metal roll and subjected to the usual vulcanizing operation. The drilling of the rubber covering is complicated by frequent inaccuracies in the spacing and pattern of the roll openings due to heat expansion of the roll and the drilling apparatus during the roll drilling operation and to certain slight inaccuracies in the indexing arrangement of the drilling apparatus that are difficult to avoid in actual practice. As a consequence of this, elaborate precautions must be observed in drilling the rubber covering to obtain satisfactory alignment between the openings and the covering and the roll. In order to allow for slight errors in the setting of the drilling apparatus for drilling the rubber covering it is customary in commercial practice to make the openings in the covering of somewhat smaller diameter as compared with the openings previously drilled in the roll. This leaves, at the inner end of each opening in the covering, a ragged edge or shoulder formation that must be trimmed or cut away by hand after the completion of the drilling operation. From these observations it will be seen that the practice now followed in the production of rubber covered suction rolls requires the use of a special drilling apparatus and offers certain complications as regards adjustment of the drill to ensure proper alignment of the openings in the covering with the openings previously drilled in the metal roll.

With the foregoing in mind, the principal object of the present invention is to provide an improved method of perforating the rubber covering of a suction roll which eliminates the drilling operation heretofore employed for this purpose; ensures exact alignment of the openings in the covering with the openings previously drilled in the metal roll; and is relatively simple and inexpensive so that, in addition to its usefulness in connection with the manufacture of new rolls, it may also be employed to advantage in connection with the application of rubber coverings to existing suction rolls of the uncovered type.

Briefly stated, the method provided in accordance with this invention consists in securing the rubber covering around the outer surface of the metal roll by means of the usual outer wrapping employed for this purpose and then, while the covering is still in the raw or unvulcanized state, driving sharp pointed pegs or pins outwardly through the previously drilled openings in the metal roll and through the rubber covering and the wrapping to provide openings in the covering in exact alignment with the openings in the roll. These pins are left in place during the subsequent vulcanizing operation and are then removed.

Proceeding now to a more detailed description reference will be had to the accompanying drawing, wherein Fig. 1 is a fragmentary longitudinal sectional view of a rubber covered suction roll illustrating the manner in which the sharp pointed pins or pegs provided in accordance with this invention are positioned in the openings of the roll preparatory to being driven outwardly through the rubber covering.

Fig. 2 is a view similar to Fig 1 but showing the pins or pegs as they appear after being driven outwardly through the holes in the metal roll and through the rubber covering.

In carrying out the method of the present invention the rubber covering indicated at 10 is applied to the outer surface of the roll 11 and firmly secured in place by means of an outer fabric wrapping 12, usually employed for this purpose. Then, while the covering is still in a raw or unvulcanized state, a pointed pin or peg 13 is placed in each of the roll openings 14, as shown in Fig. 1, and then driven outwardly through the rubber covering and wrapping so that, as shown in Fig. 2, the covering is thus provided with perforations or openings 15 in exact alignment with the roll openings. The pins or pegs 13 are left in the position shown in Fig. 2 until the rubber covering has been hardened by the usual vulcanizing operation and are then withdrawn.

If desired, the portions of the pins or pegs 13 which are driven outwardly through the rubber covering 10 may be tapered as indicated at 12a so that the openings formed in the rubber covering have the same diameter at their inner ends as the roll openings 14 but gradually decrease in diameter as they approach the outer surface of the covering.

During the piercing of the rubber covering the tendency of the pins or pegs 13 to push the covering away from the outer surface of the roll is adequately resisted by the holding effect of the outer wrapping 12. The raw or unvulcanized state of the rubber at the time the pins are driven outwardly therethrough also facilitates the piercing operation since, in this state, rubber offers little resistance to the penetration of the pins. Also the displacement of rubber caused by the pins serves to pack the rubber tightly onto the surface of the roll and around the pins themselves.

Having thus described my invention, what I claim is:—

1. A method of producing rubber covered suction rolls which comprises applying a covering of unvulcanized rubber to the outer surface of a suction roll provided with the usual openings and then, while the covering is securely held to said surface, driving pins or pegs outwardly through the roll openings, and the covering to form openings in the covering in line with the roll openings, and then subjecting the covered roll to a vulcanizing operation.

2. A method of producing rubber covered suction rolls which comprises applying a covering of unvulcanized rubber to the outer surface of a roll previously provided with the usual openings extending from its inner to its outer surface, wrapping the said covering with fabric, and then driving pins or pegs outwardly through the roll openings, the covering and the wrapping while the covering is still in an unvulcanized state and is firmly held to the outer surface of the roll by the wrapping and then subjecting the covered roll to a vulcanizing operation.

3. The method of providing a tubular member having openings therethrough with a rubber covering perforated in alignment with said openings which comprises applying a covering of unvulcanized rubber to the outer surface of said member, applying an outer wrapping of fabric to securely hold the rubber covering in place around said member, driving pins through the roll openings, covering and wrapping from the inner side of the member to produce apertures in the rubber covering registering with the roll openings and then subjecting the assembly to a vulcanizing operation with the pins left in place to maintain the alignment of the openings in the member and covering during hardening of the rubber.

HUBERT G. WELSFORD.